(12) United States Patent
Geormezi et al.

(10) Patent No.: US 7,842,775 B2
(45) Date of Patent: *Nov. 30, 2010

(54) DEVELOPMENT AND CHARACTERIZATION OF NOVEL PROTON CONDUCTING AROMATIC POLYETHER TYPE COPOLYMERS BEARING MAIN AND SIDE CHAIN PYRIDINE GROUPS

(75) Inventors: Maria Geormezi, Patras (GR); Nora Gourdoupi, Patras (GR)

(73) Assignee: Advent Technologies SA, Marousi Patras (GR)

( * ) Notice: Subject to any disclaimer, the term of this patent is extended or adjusted under 35 U.S.C. 154(b) by 0 days.

This patent is subject to a terminal disclaimer.

(21) Appl. No.: 12/546,384

(22) Filed: Aug. 24, 2009

(65) Prior Publication Data

US 2010/0047660 A1 Feb. 25, 2010

Related U.S. Application Data

(63) Continuation-in-part of application No. 11/900,304, filed on Sep. 10, 2007.

(60) Provisional application No. 60/843,879, filed on Sep. 11, 2006.

(51) Int. Cl.
*C08G 61/02* (2006.01)
(52) U.S. Cl. .................. 528/86; 528/168; 528/172; 528/211; 525/390; 429/122
(58) Field of Classification Search ................ 528/172, 528/211, 86, 168; 525/390; 429/122
See application file for complete search history.

(56) References Cited

PUBLICATIONS

Yasuda et al. Macromolecules, 2003, 36 (20).*

* cited by examiner

*Primary Examiner*—James Seidleck
*Assistant Examiner*—Shane Fang
(74) *Attorney, Agent, or Firm*—Edwards Angell Palmer & Dodge LLP; Peter F. Corless; Lisa Swiszcz

(57) ABSTRACT

Featured are novel heterocycle substituted hydroquinones, aromatic copolymers and homopolymers bearing main and side chain polar pyridine units. These polymers exhibit good mechanical properties, high thermal and oxidative stability, high doping ability and high conductivity values. These novel polymers can be used in the preparation and application of MEA on PEMFC type single cells. The combination of the above mentioned properties indicate the potential of the newly prepared materials to be used as electrolytes in high temperature PEM fuel cells.

19 Claims, 9 Drawing Sheets

DEVELOPMENT AND CHARACTERIZATION OF NOVEL PROTON CONDUCTING AROMATIC POLYETHER TYPE COPOLYMERS BEARING MAIN AND SIDE CHAIN PYRIDINE GROUPS

CROSS REFERENCE TO RELATED APPLICATION

This application claims priority to and the benefit of Provisional U.S. Application Ser. No. 60/843,879, filed Sep. 11, 2006, and U.S. application Ser. No. 11/900,304, filed Sep. 10, 2007, the entire contents of which are incorporated by reference.

FIELD OF INVENTION

This invention is related to the development of new aromatic copolymers bearing main and side chain polar pyridine units. Characterization of all prepared polymer materials, was performed using size exclusion chromatography, thermal and mechanical analysis. The copolymers present excellent film forming properties, high glass transition temperature up to 270° C. and high thermal and oxidative stability up to 480° C. The polar pyridine groups throughout the polymeric chains enable high acid uptake (800 wt %) resulting in highly ionic conductive membranes in the conductivity range of $10^{-2}$ S/cm. The combination of the above mentioned properties confirm the potential of the new prepared materials to be used as electrolytes in high temperature PEM fuel cells.

BACKGROUND INFORMATION

Proton exchange membrane fuel cells (PEMFC) have attracted considerable attention as promising power generators for automotive, stationary, as well as portable power, due to their high-energy efficiency and low emissions. The membrane is one of the key components in the design of improved polymer electrolyte membrane fuel cells. It has three main functions as electrolyte medium for ion conduction and electrode reactions, as a barrier for separating reactant gases, and as the support for electrode catalysts. An applicable PEMFC membrane should possess high ionic conductivity, low electronic conductivity, good chemical, thermal and oxidative stability as well good mechanical properties. Current technologies are based on sulfonated membranes, such as Nafion, although it is not suitable at high temperatures or under low relative humidity conditions. Also, its methanol crossover and high cost have still to be overcome for commercialization. Current research on PEMFCs is focused on the optimization of a device working at operational temperatures above 100° C. and at very low humidity levels. Operation of the fuel cells at elevated temperatures has the benefits of reducing CO poisoning of the platinum electrocatalyst and increased reaction kinetics. In this respect, new polymeric materials have been synthesized in order to replace Nafion. One of the most successful high temperature polymer membranes developed so far is the phosphoric acid-doped Polybenzimidazole (PBI). Apart from high thermal stability and good membrane-forming properties, PBI contains basic functional groups which can easily interacts with strong acids, such as $H_3PO_4$ and $H_2SO_4$, allowing proton migration along the anionic chains. Even though PBI membranes show high proton conductivity at high temperature (>100° C.) under low relative humidity conditions and have a high CO tolerance, they exhibit low oxidative stability and moderate mechanical properties. Beside Polybenzimidazole (PBI), there is a significant research effort nowadays towards the development of some novel polymeric materials, which fulfill the prerequisites for use in high temperature PEMFCs. Poly(2,5-benzimidazole) (ABPBI) is an alternative benzimidazole type polymer with thermal stability and conducting properties as good as those of PBI. On the other hand, high-temperature aromatic polyether type copolymers containing basic groups like PBI enable formation or complexes with stable acids and exhibit high thermal, chemical stability and good conducting properties in order to be used in high temperature PEMFCs.

Prior art related to methods of making membrane electrode assemblies covers issues in the following areas: (i) direct membrane catalyzation, (ii) catalyzation of coated electrode substrates, (iii) need for effecting membrane electrode bonding for seamless proton transport (iv) effective solubility of reactant gases (in particular oxygen), (v) use of pore forming agents (for effective gas transport within the electrode structure. Prior art literature relates to the specific objective of enhancing mass transport and the ability to operate a fuel cell on a sustained higher power density level.

In the context of prior art, direct catalyzation of the membrane has been described in various patents and scientific literature primarily on aqueous based polymer electrolytes, most notably of the perfluorinated sulfonic acid type. At the current state of the technology, prior efforts together with current approaches have to be tempered with the ability to translate developments in this regard to mass manufacturability while keeping reproducibility (batch vs. continuous) and cost in perspective. Depending on the deposition methods used, the approach towards lowering noble metal loading can be classified into five broad categories, (i) thin film formation with carbon supported electrocatalysts, (ii) pulse electrodeposition of noble metals (Pt and Pt alloys), (iii) sputter deposition (iv) pulse laser deposition, and (v) ion-beam deposition. While the principal aim in all these efforts is to improve the charge transfer efficiency at the interface, it is important to note that while some of these approaches provide for a better interfacial contact allowing for efficient movement of ions, electrons and dissolved reactants in the reaction zone, others additionally effect modification of the electrocatalyst surface (such as those rendered via sputtering, electrodeposition or other deposition methods).

In the first of the five broad categories using the 'thin film' approach in conjunction with conventional carbon supported electrocatalysts, several variations have been reported, including (a) the so called 'decal' approach where the electrocatalyst layer is cast on a PTFE blank and then decaled on to the membrane (Wilson and Gottesfeld 1992; Chun, Kim et al. 1998). Alternatively an 'ink' comprising of Nafion® solution, water, glycerol and electrocatalyst is coated directly on to the membrane (in the Na+ form) (Wilson and Gottesfeld 1992). These catalyst coated membranes are subsequently dried (under vacuum, 160° C.) and ion exchanged to the H+ form (Wilson and Gottesfeld 1992). Modifications to this approach have been reported with variations to choice of solvents and heat treatment (Qi and Kaufman 2003; Xiong and Manthiram 2005) as well as choice of carbon supports with different microstructure (Uchida, Fukuoka et al. 1998). Other variations to the 'thin film' approach have also been reported such as those using variations in ionomer blends (Figueroa 2005), ink formulations (Yamafuku, Totsuka et al. 2004), spraying techniques (Mosdale, Wakizoe et al. 1994; Kumar and Parthasarathy 1998), pore forming agents (Shao, Yi et al. 2000), and various ion exchange processes (Tsumura, Hitomi et al. 2003). At its core this approach relies on extending the reaction zone further into the electrode structure away from the membrane, thereby providing for a more three dimensional zone for charge transfer. Most of the variations reported above thereby enable improved transport of ions, electrons and dissolved reactant and products in this 'reaction layer' motivated by need to improve electrocatalyst utilization. These attempts in conjunction with use of Pt alloy electrocatalysts have formed the bulk of the current state of the art in the PEM fuel cell technology. Among the limitations of this approach are problems with controlling the Pt particle size (with loading on carbon in excess of 40%), uniformity of deposition in large scale production and cost (due to several complex processes and/or steps involved).

An alternative method for enabling higher electrocatalyst utilization has been attempted with pulse electrodeposition. Taylor et al., (Taylor, Anderson et al. 1992) one of the first to report this approach used pulse electrodeposition with Pt salt solutions which relied on their diffusion through thin Nafion® films on carbon support enabling electrodeposition in regions of ionic and electronic contact on the electrode surface. See a recent review on this method by Taylor et al., describing various approaches to pulse electrodeposition of catalytic metals (Taylor and Inman 2000). In principal this methodology is similar to the 'thin film' approach described above, albeit with a more efficient electrocatalyst utilization, since the deposition of electrocatalysts theoretically happens at the most efficient contact zones for ionic and electronic pathways. Improvements to this approach have been reported such as by Antoine and Durand (Antoine and Durand 2001) and by Popov et al., (Popov 2004). Developments in the pulse algorithms and cell design have enabled narrow particle size range (2-4 nm) with high efficiency factors and mass activities for oxygen reduction. Though attractive, there are concerns on the scalability of this method for mass scale manufacturing.

Sputter deposition of metals on carbon gas diffusion media is another alternative approach. Here however, interfacial reaction zone is more in the front surface of the electrode at the interface with the membrane. The original approach in this case was to put a layer of sputter deposit on top of a regular Pt/C containing conventional gas diffusion electrode. Such an approach (Mukerjee, Srinivasan et al. 1993) exhibited a boost in performance by moving part of the interfacial reaction zone in the immediate vicinity of the membrane. Recently, Hirano et al. (Hirano, Kim et al. 1997) reported promising results with thin layer of sputter deposited Pt on wet proofed non catalyzed gas diffusion electrode (equivalent to 0.01 $mg_{Pt}/cm^2$) with similar results as compared to a conventional Pt/C (0.4 $mg_{Pt}/cm^2$) electrode obtained commercially. Later Cha and Lee (Cha and Lee 1999), have used an approach with multiple sputtered layers (5 nm layers) of Pt interspersed with Nafion®-carbon-isopropanol ink, (total loading equivalent of 0.043 $mg_{Pt}/cm^2$) exhibiting equivalent performance to conventional commercial electrodes with 0.4 $mg_{Pt}/cm^2$. Haug et al. (Haug 2002) studied the effect o substrate on the sputtered electrodes. Further, O'Hare et al., on a study of the sputter layer thickness has reported best results with a 10 nm thick layer. Further, significant advancements have been made with sputter deposition as applied to direct methanol fuel cells (DMFC) by Witham et al. (Witham, Chun et al. 2000; Witham, Valdez et al. 2001) wherein several fold enhancements in DMFC performance was reported compared to electrodes containing unsupported PtRu catalyst. Catalyst utilization of 2,300 mW/mg at a current density of 260 to 380 $mA/cm^2$ was reported (Witham, Chun et al. 2000; Witham, Valdez et al. 2001). While the sputtering technique provides for a cheap direct deposition method, the principal drawback is the durability. In most cases the deposition has relatively poor adherence to the substrate and under variable conditions of load and temperature, there is a greater probability of dissolution and sintering of the deposits.

An alternative method dealing direct deposition was recently reported using pulsed laser deposition (Cunningham, Irissou et al. 2003). Excellent performance was reported with loading of 0.017 mgPt/cm2 in a PEMFC, however this was only with the anode electrodes, no cathode application has been reported to date.

However, in all these new direct deposition methodologies, mass manufacturability with adequate control on reproducibility remains questionable at best. In this regard the methodologies developed by 3 M company is noteworthy, where mass manufacture of electrodes with low noble metal loading is reported (Debe, Pham et al. 1999; Debe, Poirier et al. 1999). A series of vacuum deposition steps are involved with adequate selection of solvents and carbon blacks resulting in nanostructured noble metal containing carbon fibrils which are embedded into the ionomer-membrane interface (Debe, Haugen et al. 1999; Debe, Larson et al. 1999).

An alternative is the use of ion-beam techniques, where the benefits of low energy ion bombardment concurrent to thin film vacuum deposition (electron beam) process is exploited for achieving dense, adhering and robust depositions (Hirvonen 2004). This method has been recently reviewed (Hirvonen 2004) in terms of both mechanisms of ion/solid interactions during thin film growth as well as development of various protocols for specific application areas, including tribology, anti corrosion coatings, superconducting buffer layers and coatings on temperature sensitive substrates such as polymers. Modifications of this approach to prepare 3-D structures including overhang and hollow structures have also been recently reported (Hoshino, Watanabe et al. 2003). Use of dual anode ion source for high current ion beam applications has also been reported recently (Kotov 2004), where benefits for mass production environment is discussed.

It thus would be desirable to provide a method for improving the catalyst utilization at the interface of a polymer electrolyte imbibed with ion conducting components (such as phosphoric, polyphosphoric and analogs of perfluorinated sulfonic acids) so as to enable higher power densities (i.e., 400 $mW/cm^2$ at 0.5 V vs. RHE, 170-180° C., $H_2$/Air). It would also be desirable to provide improved power density attained with lower Pt loading (0.3 to 0.4 $mg/cm^2$) as compared to the current state of the art which is in the range 0.5 to 1.0 $mg/cm^2$, thus providing for a better gravimetric energy density. It would be further desirable to provide an improved ability to retain ion conducting elements (such as phosphoric, polyphosphoric and analogs of perfluorinated sulfonic acids) within the reaction layer (catalyst containing zone at the interface between the electrode and the membrane). It would be particularly desirable from the perspective of long term sustained power density as well as better tolerance to both load and thermal cycling (especially transitions to below the condensation zone).

SUMMARY OF THE INVENTION

The present invention is related to the development of new heterocycle substituted hydroquinones, aromatic copolymers and homopolymers bearing main and side chain polar pyridine units. These polymers exhibit good mechanical properties, high thermal and oxidative stability, high doping ability and high conductivity values. The invention further relates to the preparation and application of MEA on PEMFC type single cells. The combination of the above mentioned properties indicate the potential of the newly prepared materials to be used as electrolytes in high temperature PEM fuel cells.

In one aspect, the invention generally relates to a compound comprising the general structural formula:

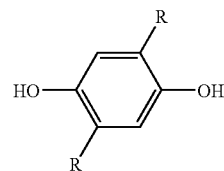

Formula I wherein R is selected from the group consisting of

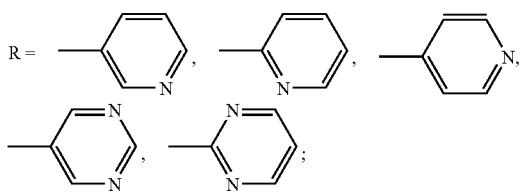

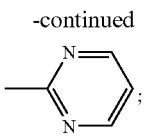

or a salt thereof.

In another aspect, the invention generally relates to a process for preparing a compound comprising the general structural Formula I by coupling a compound of the formula:

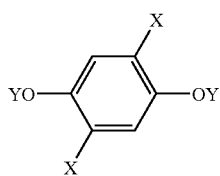

wherein X is a metal or metalloid atom or an electrophile or leaving group; and Y is H or a protecting group; with a compound selected from:

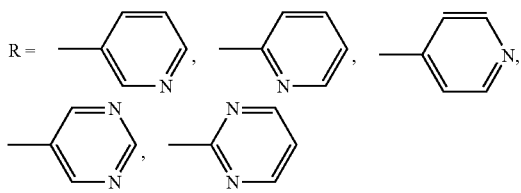

wherein Z is a metal or metalloid atom or an electrophile or leaving group, in the presence of a metal containing catalyst. In some embodiments according to this aspect of the invention, the coupling reaction can be a Suzuki cross coupling reaction of an aryl-boronic acid with an aryl-halide catalyzed by a palladium(0) complex.

In another aspect, the invention generally relates to an aromatic polyether copolymer comprising the general structural formula:

X is selected from the group consisting of:

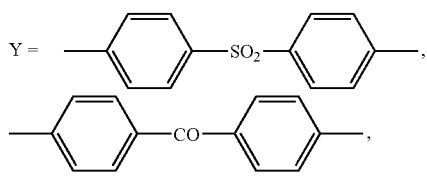

Y is selected from the group consisting of:

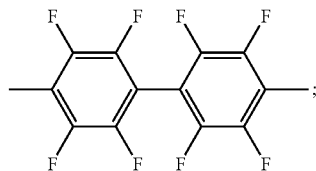

Formula II

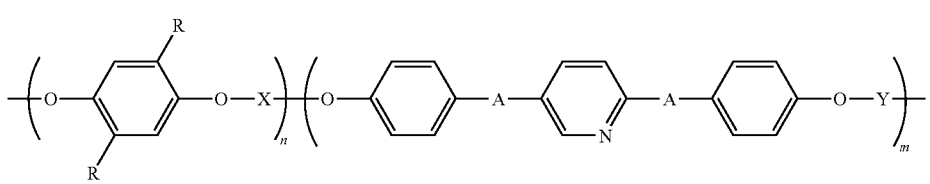

wherein R is selected from the group consisting of:

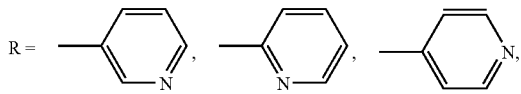

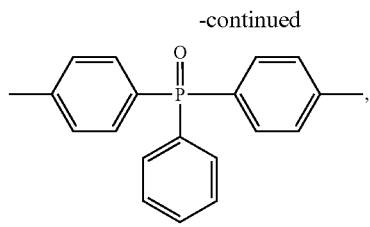

-continued

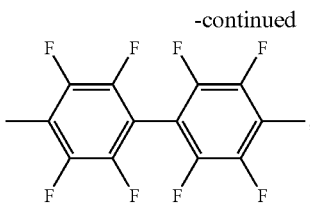

A is selected from the group consisting of: A=—CH$_2$, —CF$_2$, -phenyl, none; and n ranges from about 0.5% to about 99.5%, m ranges from about 99.5% to about 0.5%, and n+m=100%; or a salt thereof.

Embodiments according to this aspect of the invention can include the following features. The aromatic polyether copolymer can be a block copolymer, random copolymer, periodic copolymer and/or alternating polymer. In some embodiments, n can range from about 0.5% to about 60% and m can ranges from about 99.5% to about 40%. In some embodiments n can range from about 40% to about 50% and m ranges from about 60% to about 50%. In some embodiments, the aromatic polyether copolymer has a molecular weight ($M_n$) of no greater than about 120,000. In some embodiments, the aromatic polyether copolymer can have a molecular weight ($M_n$) ranging from about 10,000 to about 100,000.

In another aspect, the invention generally relates to an aromatic polyether comprising the general structural formula:

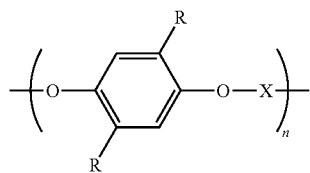

Formula III wherein R is selected from the group consisting of:

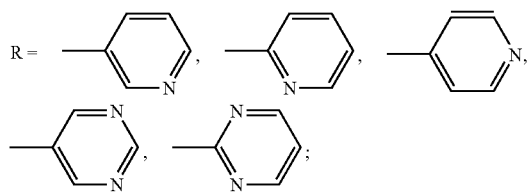

and X is selected from the group consisting of:

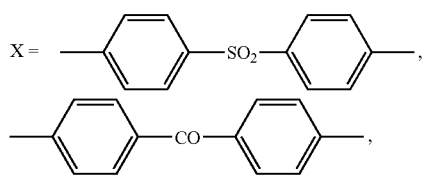

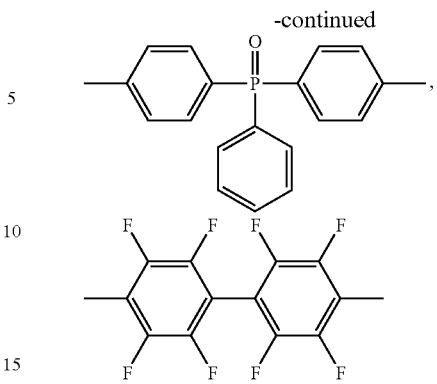

or a salt thereof.

Embodiments according to this aspect of the invention can include the following features. The aromatic polyether can be a block copolymer, random copolymer, periodic copolymer and/or alternating polymer.

In another aspect, the invention generally relates to a process for preparing the polymer or copolymer of Formula II or III, wherein the process comprises polycondensing monomers at high temperature under conditions such that the polymer or copolymer is formed.

In another aspect, the invention generally relates to a process for preparing the polymer or copolymer of Formula II or III, wherein the process comprises reacting an aromatic difluoride with the compound of Formula I. In some embodiments, the aromatic difluoride is bis-(4-fluorophenyl)sulfone, bis-(4-fluorophenyl)phenylphosphine oxide, 4,4'-difluorobenzophenone, or decafluorobipheynyl.

In another aspect, the invention generally relates to a blend of copolymers or homopolymers, the blend prepared by mixing a dimethylacetamide solution of the polymer of Formula II and a dimethylacetamide solution of the copolymer of Formula III in a predetermined ratio. In some embodiments, the predetermined ratio is about 50/50.

In another aspect, the invention generally relates to a process for preparing the polymer or copolymer of Formula II or Formula III, wherein the process comprises reacting an aromatic difluoride with the compound of Formula I.

In another aspect, the invention generally relates to a composition comprising a slurry mixture of a polymer, copolymer, or blend of Formula II, Formula III, or a blend prepared by mixing a dimethylacetamide solution of the polymer of Formula II and a dimethylacetamide solution of the copolymer of Formula III in a predetermined ratio (e.g. about 50/50) and a polar aprotic solvent. In some embodiments, the invention generally relates to a method of preparing a catalyst comprising depositing a layer of the composition by calendaring, screen printing or spraying on a hydrophobic layer; and drying and sintering the deposited layer.

In another aspect, the invention generally relates to a layered membrane electrode assembly, comprising a substrate layer; a gas diffusion layer; and a reaction layer.

Other aspects of the invention are disclosed infra.

BRIEF DESCRIPTION OF THE DRAWINGS

For a fuller understanding of the nature and desired objects of the present invention, reference is made to the following detailed description taken in conjunction with the accompanying drawing figures wherein.

DEFINITIONS

Figure 1:
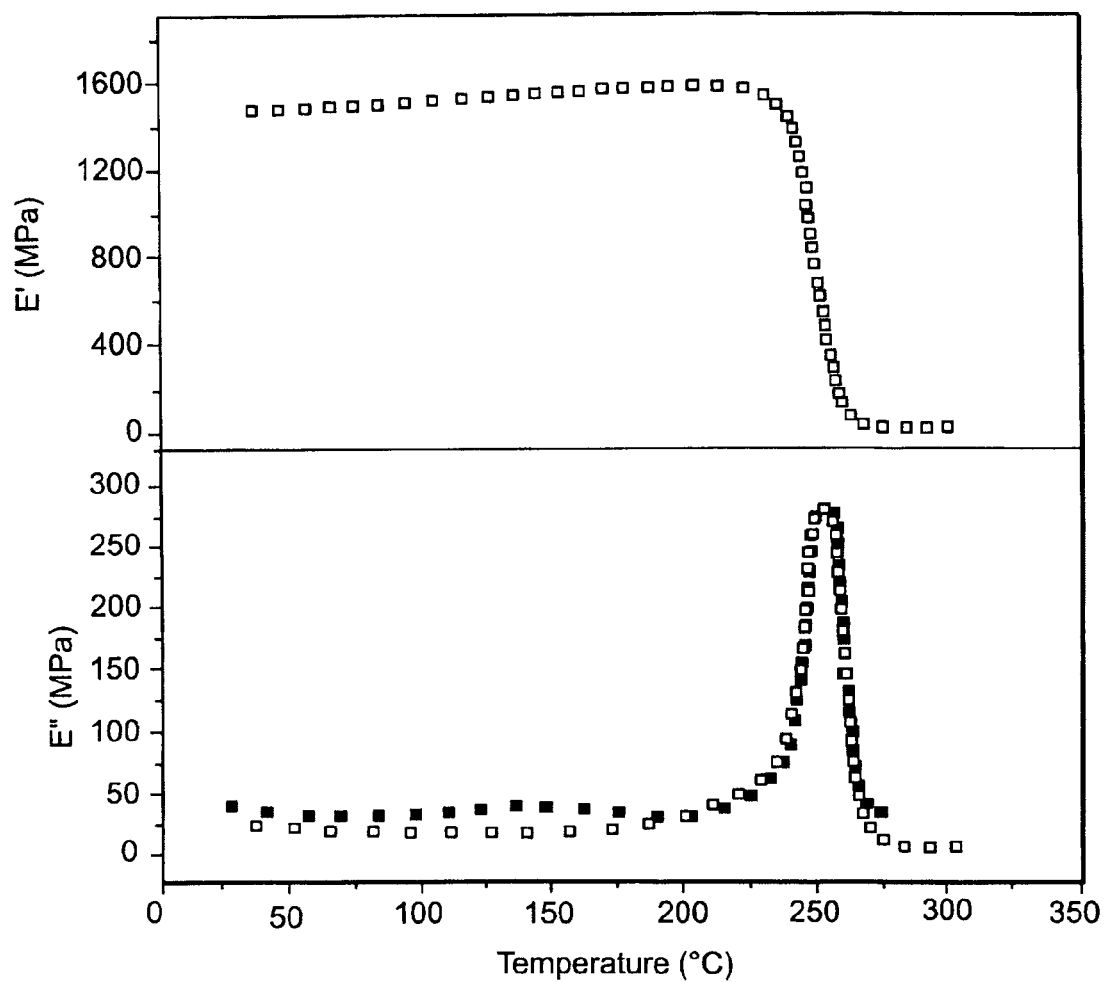
FIG. 1 shows temperature dependence of the storage (E') and loss (E") modulus of copolymer dPPy(50)coPPyPES before (■) and after (□) the treatment with $H_2O_2$.

The following definitions are for convenient reference with respect to the following description and are not to be construed in a limiting manner.

The term Gel Permeation Chromatography ("GPC") shall be understood to mean or refer to a method or technique used in order to determine the molecular weight (Mn and Mw) and dispersity of the polymers.

The term Nuclear Magnetic Resonance ("NMR") shall be understood to mean or refer to a method or technique used in order to identify the chemical and molecular structure of the polymers and the proportion of the monomers in the copolymers.

The term Dynamic Mechanical Analysis ("DMA") shall be understood to mean or refer to a method or technique used in order to identify the Tg (glass transition temperature) of the polymers.

The term Thermogravimetric Analysis ("TGA") shall be understood to mean or refer to a method or technique used in order to study the thermal, and oxidative stability before and after Fenton's test.

The term Fenton's Test shall be understood to mean or refer to a method or technique used in order to study and determine the oxidative stability of the polymers.

The term Four Prove Technique shall be understood to mean or refer to a method or technique used in order to study the dependence of the ionic conductivity on high doping levels versus temperature as well as the dependence of the ionic conductivity versus doping level.

DETAILED DESCRIPTION OF THE INVENTION

Polymer Membrane Electrolyte

The present invention relates to the development and characterization of new polymeric materials (structures 1 and 2) comprising copolymers and homopolymers bearing main and side chain pyridine and pyrimidine groups and different aromatic difluorides and blends thereof. The polymer structures are given below.

Structure 1

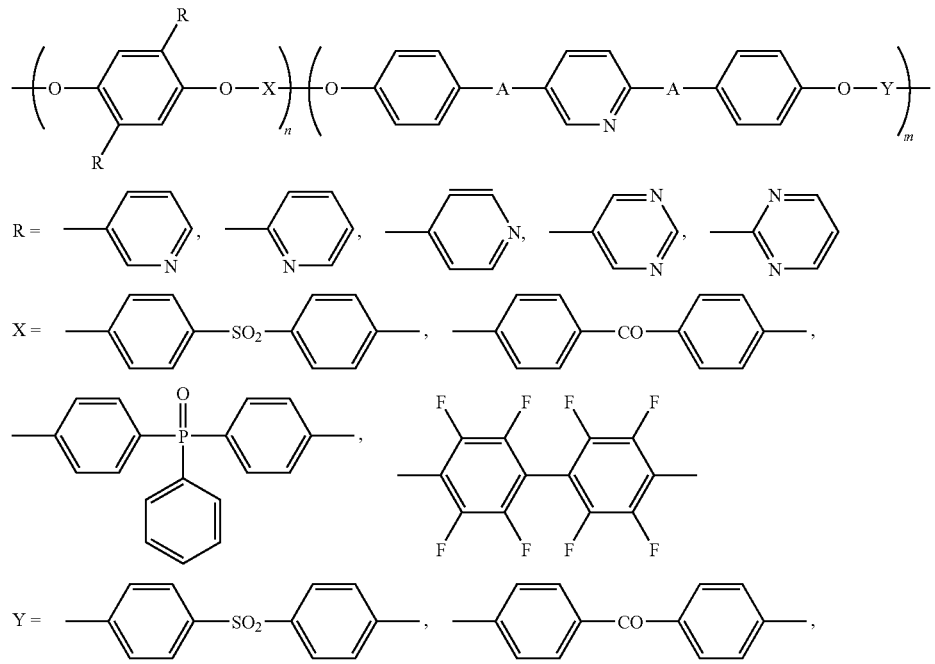

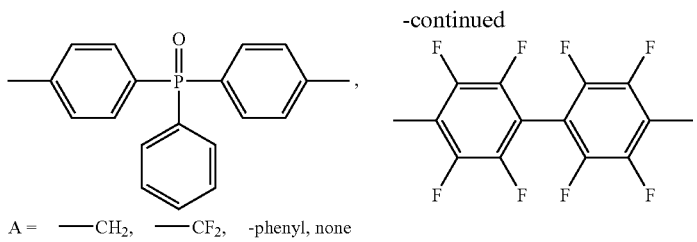

A =    —CH₂—,    —CF₂—,    -phenyl,    none and wherein n ranges from about 0.5% to about 99.5% % and m ranges from about 99.5% to about 0.5%, and n+m=100%. In some embodiments n ranges from about 0.5% to about 60% and m ranges from about 99.5% to about 40%. In some other embodiments, n ranges from about 40% to about 50% and m ranges from about 60% to about 50%. In some embodiments, n and m values are such that the resulting material has a molecular weight ($M_n$) of no greater than about 120,000. For example, in some embodiments, molecular weights of materials can range from about 10,000 to about 100,000. However, molecular weights outside of these ranges can also be used in some embodiments.

Structure 2

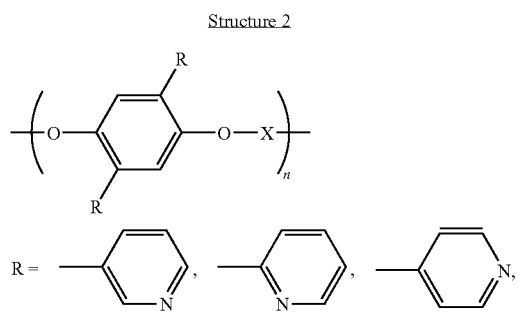

-continued

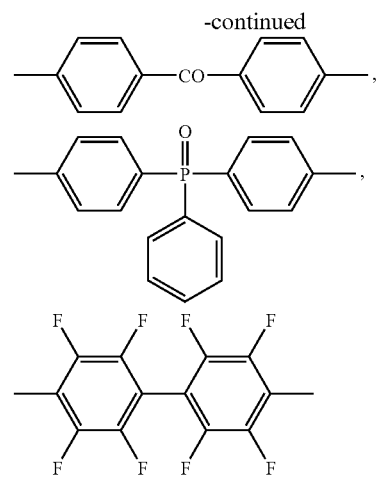

For the purpose of the present invention, aromatic polyethers bearing main and side chain pyridine units are preferable. The membranes are composed of copolymers (copolymers 1 and 2) and homopolymers (homopolymers 1 and 2). The polymer structures are given below. x is the content of the side chain pyridine into the polymer main chain.

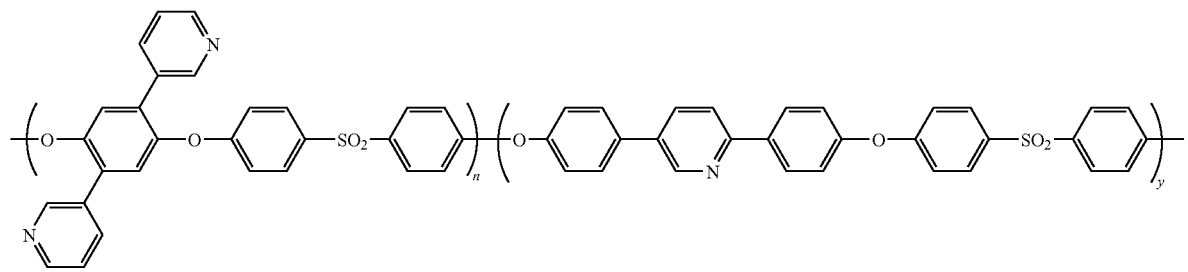

copolymer 1: dPPy(x)coPPyPES

-continued

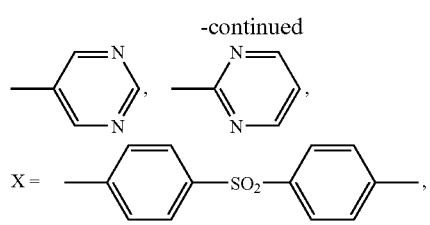

It is noted that x and y values set forth in the structure of copolymer 1 generally correspond to the n and m values set forth above. As such, x can range from about 0.5% to about 99.5% and y can range from about 99.5% to about 0.5%, wherein x+y=100%. In some embodiments x ranges from about 0.5% to about 60% and y ranges from about 99.5% to about 40%. In some embodiments, x ranges from about 40% to about 50% and y ranges from about 60% to about 50%. It is believed that when copolymer 1 is provided with x values in the lower range, particularly below about 30%, the resulting materials can be fragile. On the other hand, values of x in the upper range, particularly above about 50%, can result in materials that are not very soluble in solvents in which the present materials are dissolved to form films and MEAs in accordance with embodiments of the invention. However, it is noted that in some embodiments, blends of the present polymeric and copolymeric materials are used and, as such, materials having x and y values in the upper and lower ranges can suitably be used in combination with other materials of the invention to provide the desired properties. In some embodiments, copolymer 1 is provided with x and y values such that the resulting material has a molecular weight ($M_n$) of no greater than about 120,000. For example, in some embodiments, molecular weights of materials can range from about 10,000 to about 100,000. However, molecular weights outside of these ranges can also be used in some embodiments.

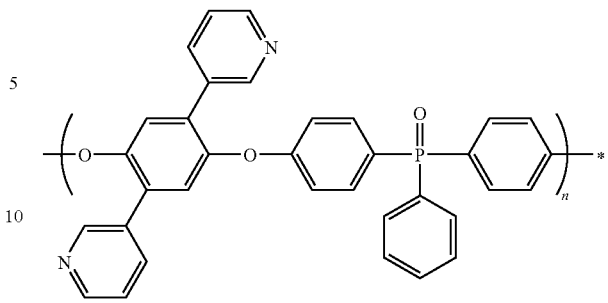

homopolymer 2: dPPyPO

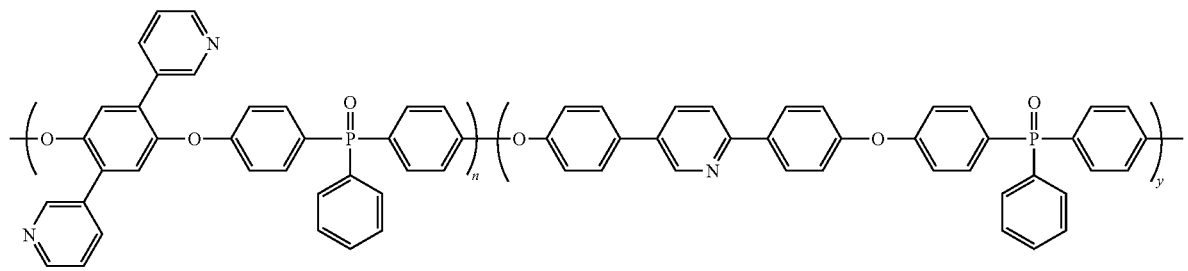

copolymer 2: dPPy(x)coPPyPO

It is noted that x and y values set forth in the structure of copolymer 2 also generally correspond to the n and m values set forth above. As such, x can range from about 0.5% to about 99.5% and y can range from about 99.5% to about 0.5%, wherein x+y=100%. In some embodiments, x ranges from about 0.5% to about 60% and y ranges from about 99.5% to about 40%. In some embodiments x ranges from about 5% to about 50% and y ranges from about 95% to about 50%.

It is believed that when copolymer 2 is provided with X values in the upper range, particularly above about 60%, the resulting materials can be fragile. However, it is noted that in some embodiments, blends of the present polymeric and copolymeric materials are used and, as such, materials having x and y values in the upper and lower ranges can suitably be used in combination with other materials of the invention to provide the desired properties. In some embodiments, copolymer 2 is provided with X and Y values such that the resulting material has a molecular weight of no greater than about 120,000. For example, in some embodiments, molecular weights of materials can range from about 10,000 to about 100,000. However, molecular weights outside of these ranges can also be used in some embodiments.

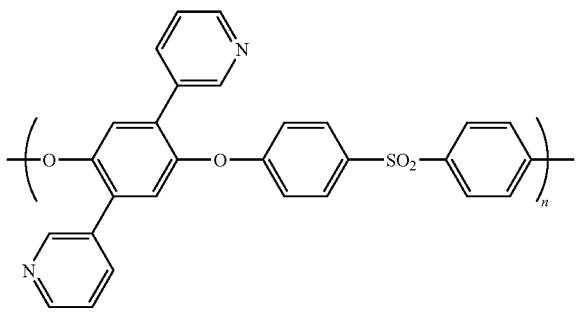

homopolymer 1: dPPyPES

Figure 2:
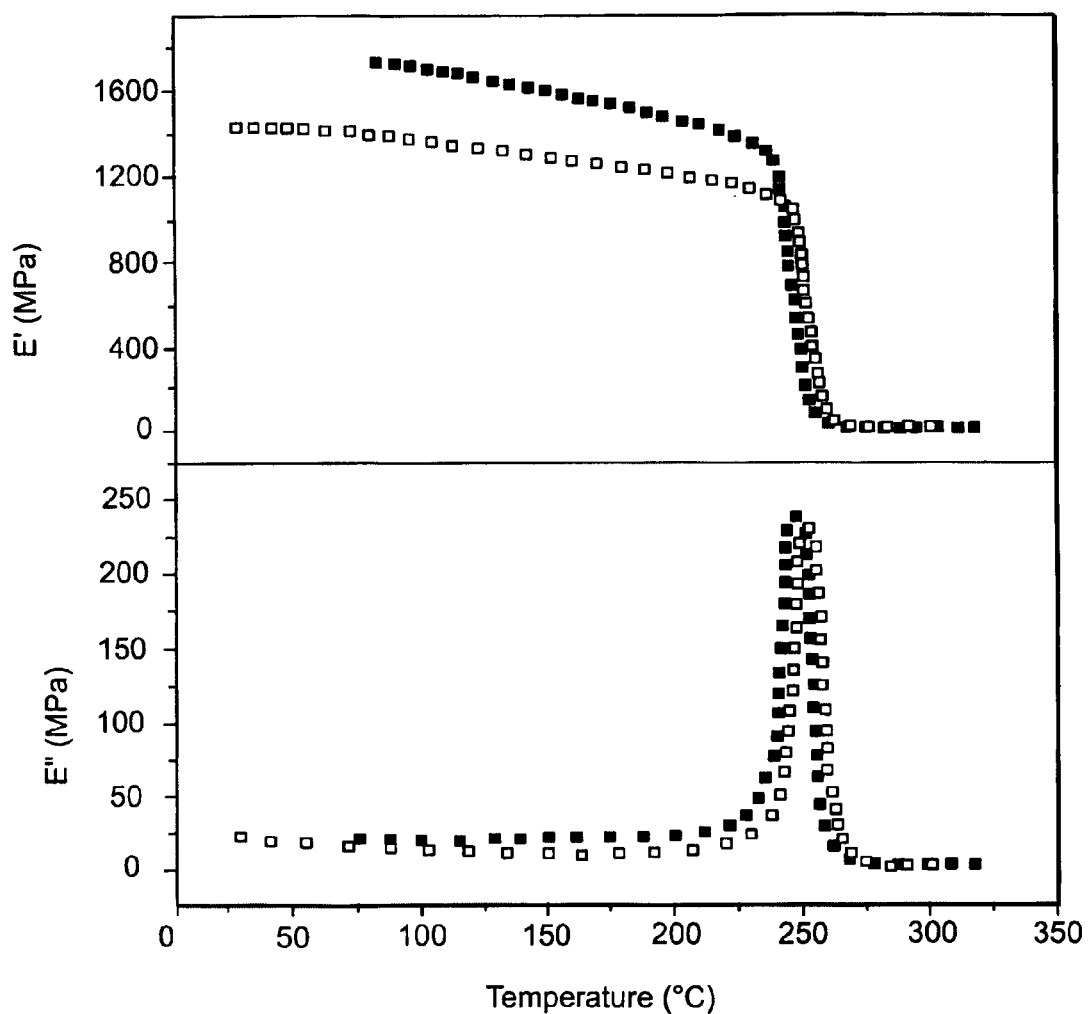
FIG. 2 shows temperature dependence of the storage (E') and loss (E") modulus of copolymer dPPy(50)coPPyPO before (■) and after (□) the treatment with $H_2O_2$.
Figure 3:
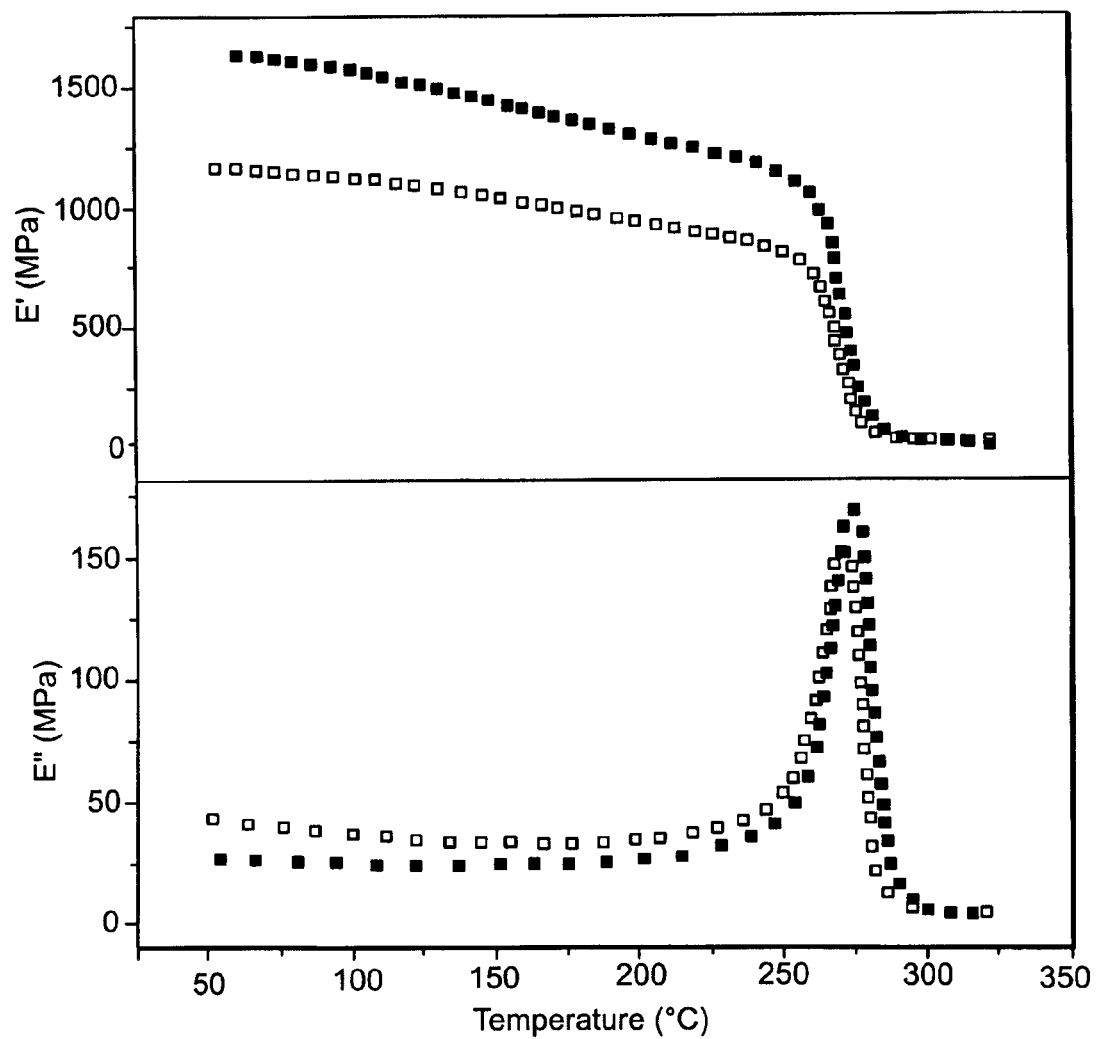
FIG. 3 shows temperature dependence of the storage (E') and loss (E") modulus of copolymer dPPy(10)coPPyPO before (■) and after (□) the treatment with $H_2O_2$.
Figure 4:
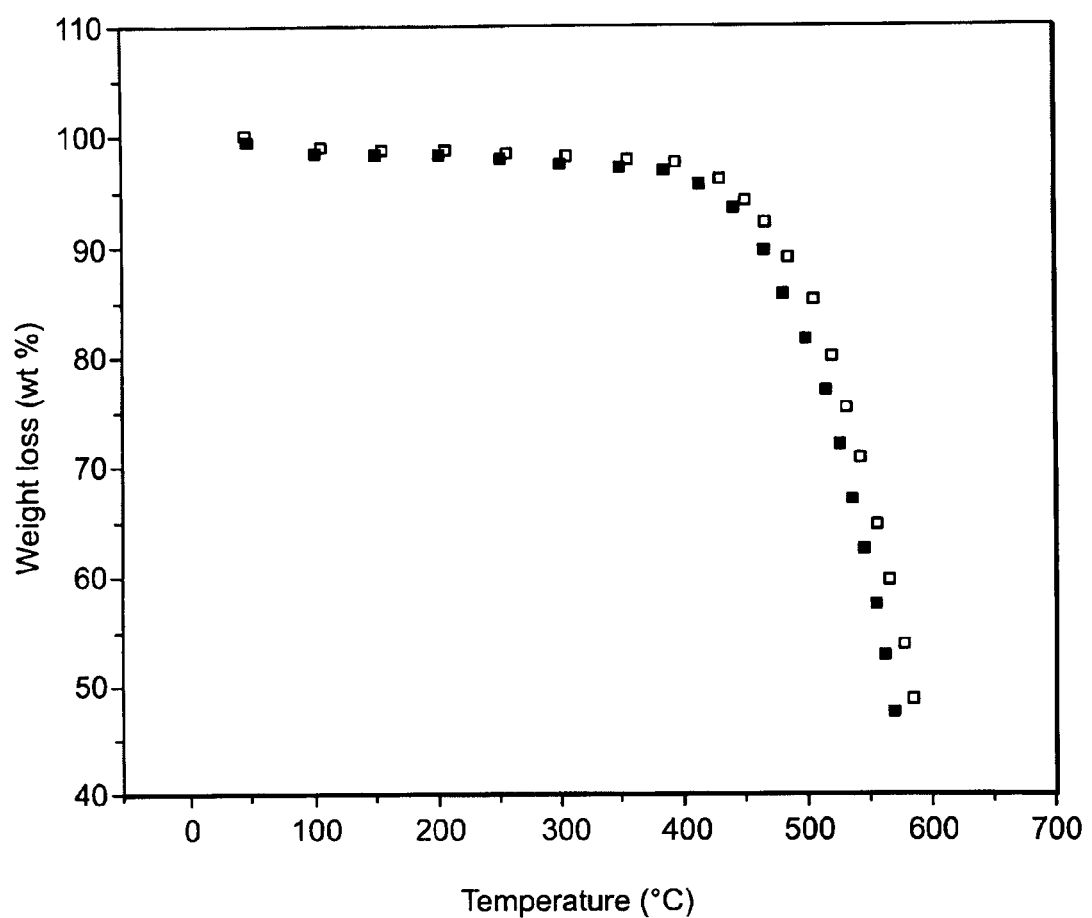
FIG. 4 shows thermogravimetric analysis of dPPy(50)coP-PyPES before (■) and after (□) the treatment with $H_2O_2$.
Figure 5:
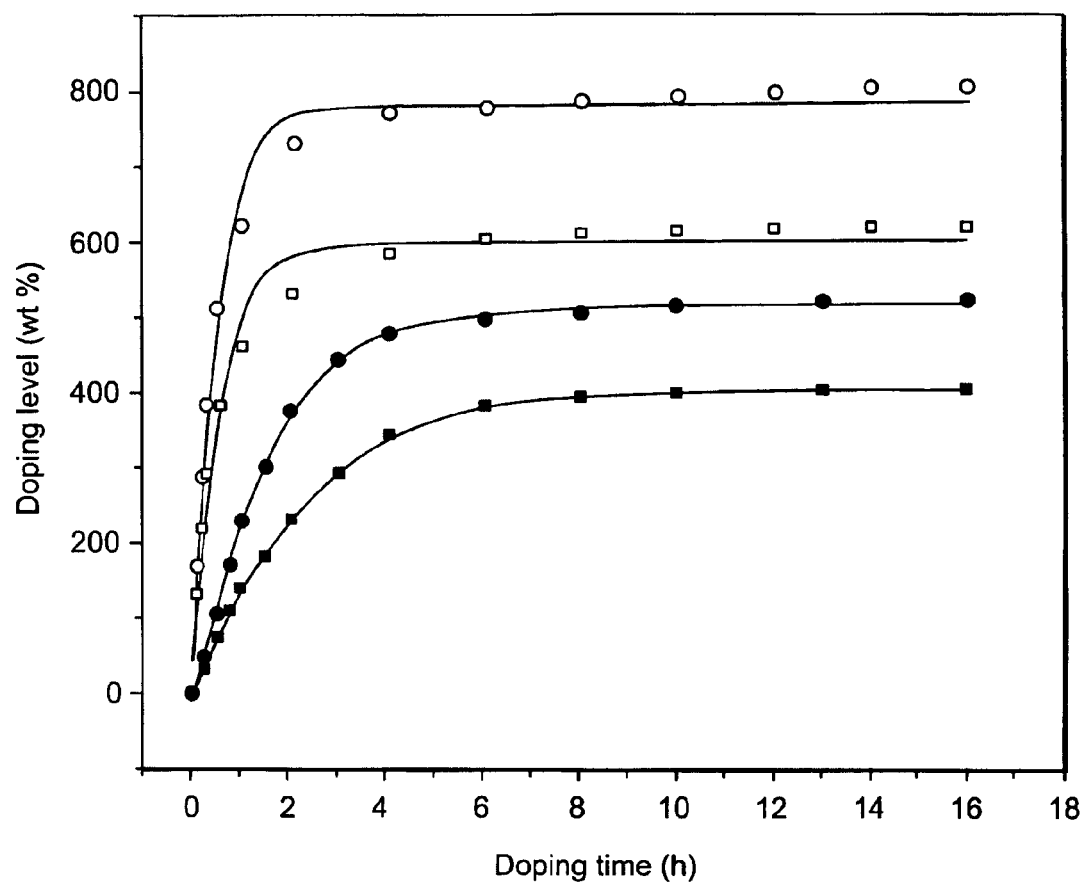
FIG. 5 shows time dependence of doping level (wt %) of dPPy(40)coPPyPES at 25° C. (■) and 50° C. (□) and of dPPy(50)coPPyPES at 25° C. (●) and 50° C. (○)
Figure 6:
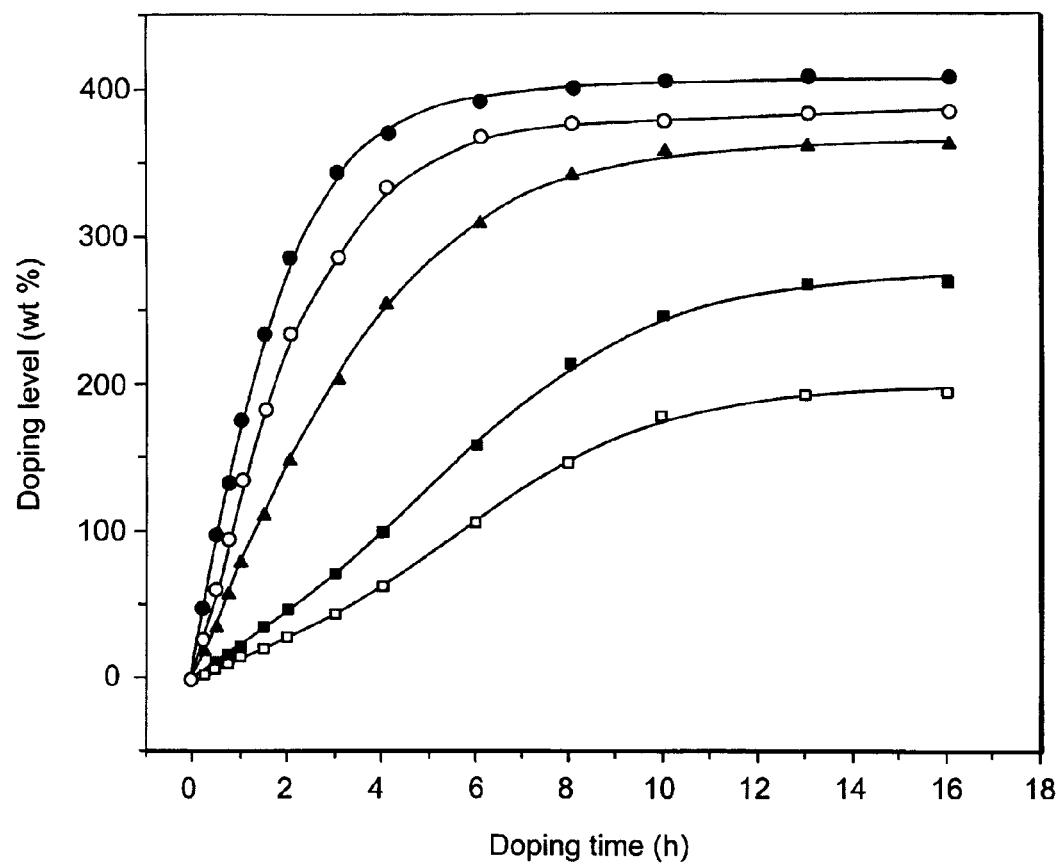
FIG. 6 shows time dependence of doping level (wt %) of dPPy(10)coPPyPO(□), dPPy(20)coPPyPO(■), dPPy(30)coPPyPO(▲), dPPy(40)coPPyPO(○), dPPy(50)coPPyPO(●) at 25° C.
Figure 7:
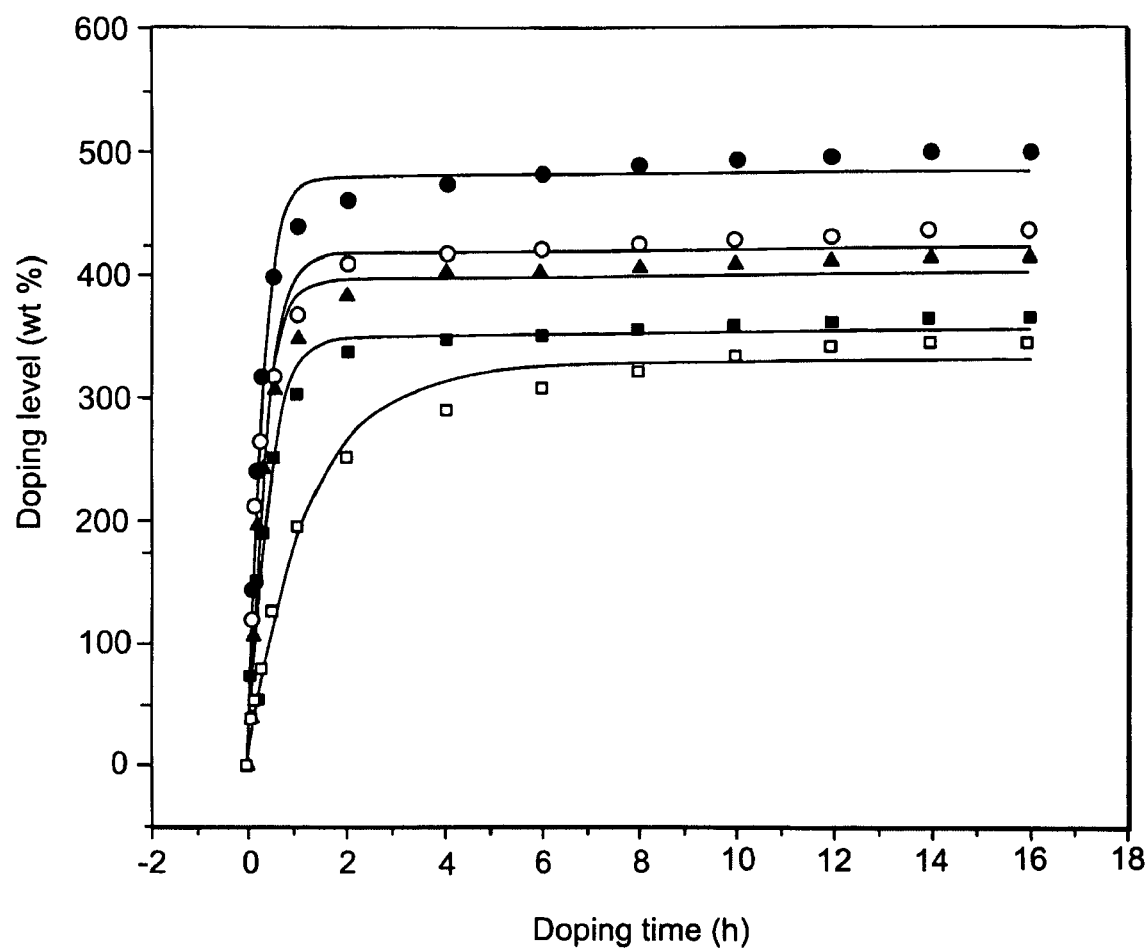
FIG. 7 shows time dependence of doping level (wt %) of PPy(10)coPPyPO(□), dPPy(20)coPPyPO(■), dPPy(30)coPPyPO (▲), dPPy(40)coPPyPO(○), dPPy(50)coPPyPO (●) at 50° C.
Figure 8:
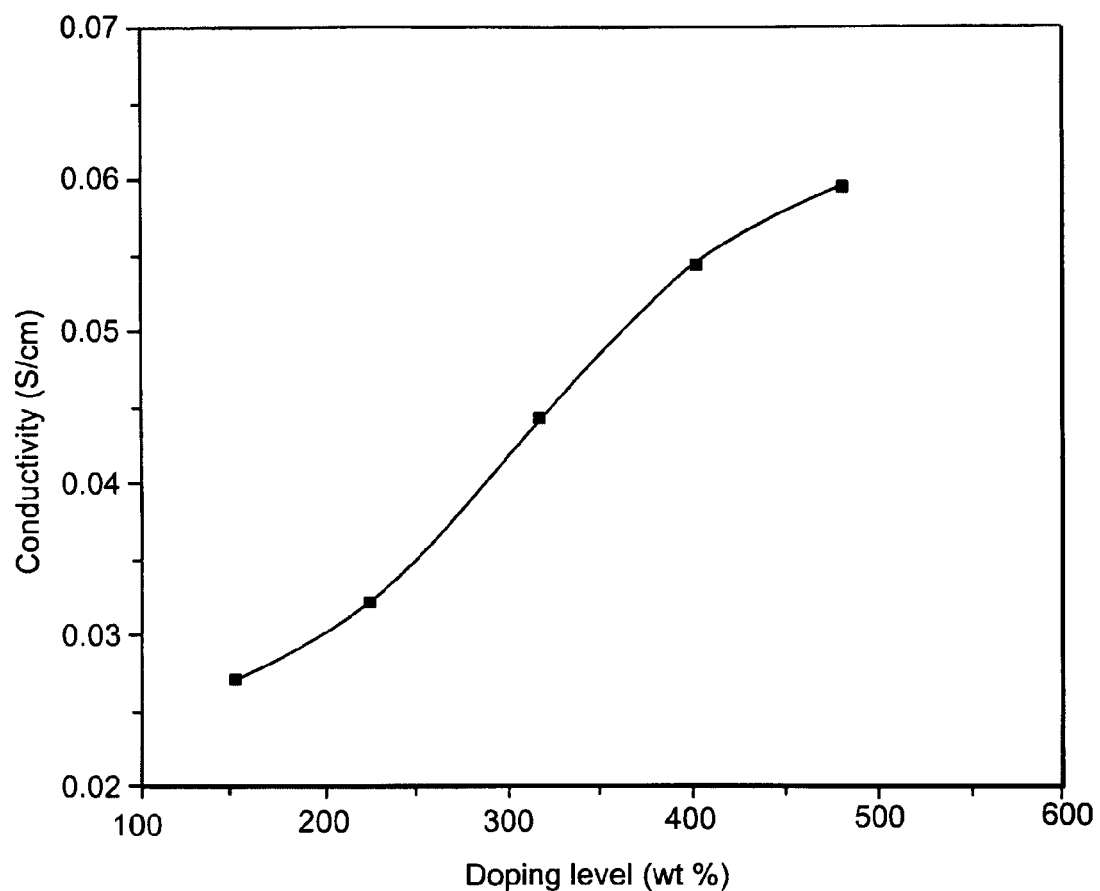
FIG. 8 shows doping level dependence of ionic conductivity of dPPy(50)coPPyPES at room temperature.
Figure 9:
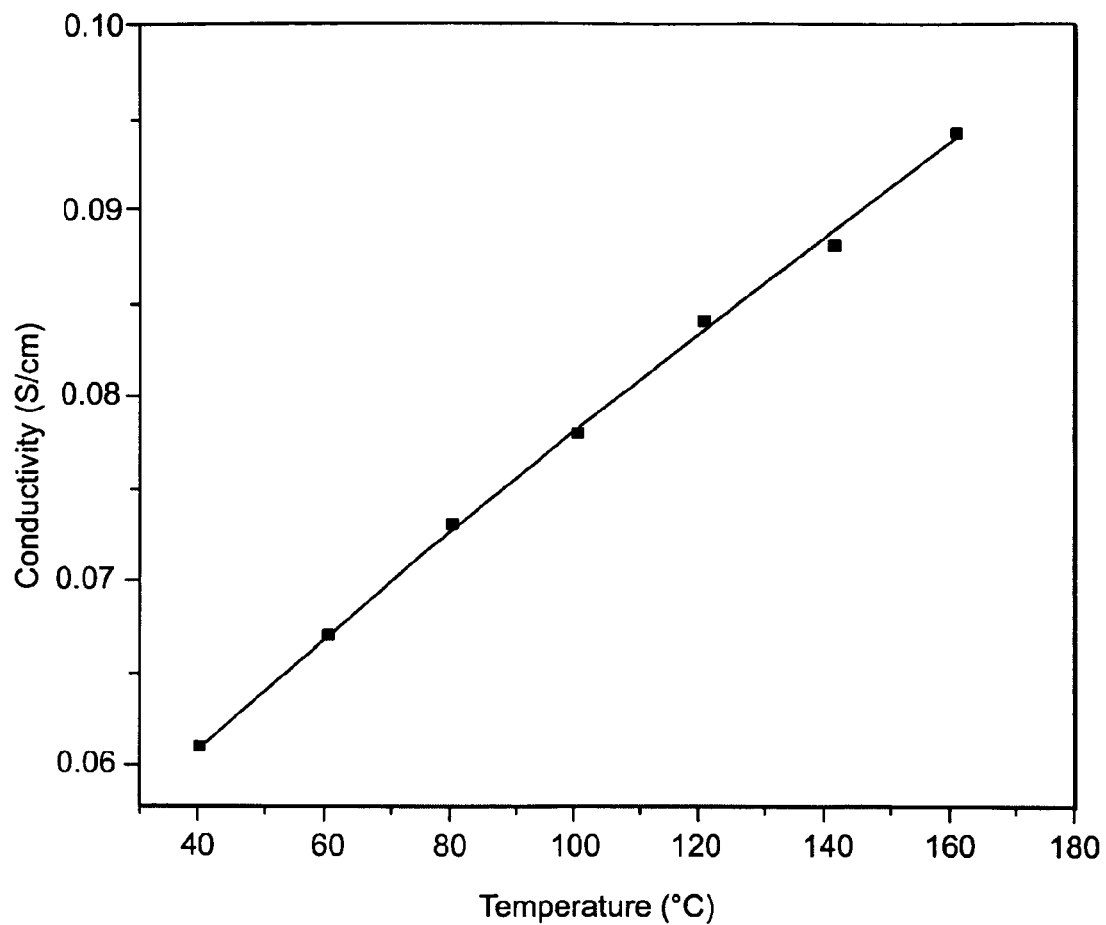
FIG. 9 shows temperature dependence of ionic conductivity of acid doped dPPy(50)coPPyPES with a doping level 480 wt % $H_3PO_4$ and relative humidity 60%.

The above polymers are easily doped with inorganic acids such as phosphoric acid resulting in ionically conducting membranes. These copolymers exhibit glass transition temperature in the range of about 245° C.-270° C. depending on the structure and the copolymer composition. The oxidative stability of the copolymers can be examined with dynamic mechanical analysis and thermogravimetric analysis. As shown in FIGS. 1-3, the copolymers retain their flexibility and mechanical integrity both before and after treatment. The chemical, thermal and oxidative stability of the copolymers can be examined using the Fenton's test. Membrane samples are immersed into 3 wt % $H_2O_2$ aqueous solution containing 4 ppm $FeCl_2 \times 4H_2O$ at 80° C. for 72 h. FIG. 4 illustrates the weight of dry samples before and after experimentation. As shown, the blend membranes retain their mechanical integrity and their high thermal stability. As shown in FIGS. 5-7, in order to obtain the maximum doping level, the membranes are immersed into 85 wt % phosphoric acid solution at different temperatures and for different doping times depending on the membrane composition. The wet membranes are wiped dry and quickly weighed again. The acid uptake of membranes is defined as the weight percent of the acid per gram of the copolymer. As the doping temperature increases the phosphoric acid doping level also increases reaching plateau values of around 800 wt % $H_3PO_4$ doping level for the copolymer 1 at 50° C. FIG. 8 illustrates the doping dependence of the conductivity of a sample of copolymer 1 doped with phosphoric acid. FIG. 9 illustrates the effect of temperature of the conductivity of copolymer 1 doped with 480 wt % phosphoric acid. As shown, the conductivity increases as temperature increases. At 160° C. the conductivity reached a value of $5.9 \times 10^{-2}$ S/cm even at room temperature.

The present invention relates to a method for implementing membrane electrode assemblies using the new polymer electrolytes as described herein. The method for implementing of membrane electrode assembly includes (a) a gas diffusion and current collecting electrode component, (b) a reaction layer component comprising of a catalyst and ion conducting elements in conjunction with crosslinkers, and (c) Pt alloy electrocatalysts for enhanced CO tolerance and oxygen reduction reaction activity.

The Gas Diffusion Electrode Component

The electrically conducting substrate is selected from a combination of woven carbon cloth (such as Toray fiber T-300) or paper (such as the Toray TGP-H-120), previously wet-proofed using TFE based solutions (DuPont, USA). The typical porosity of this carbon substrate is between 75-85%. The wet proofing is achieved with a combination of dip coating for fixed duration (between 30 secs to 5 mins) followed with drying in flowing air. Such a wet proofed substrate can be coated with a gas diffusion layer comprising of select carbon blacks and PTFE suspension. The choice of carbon blacks used in this layer range from Ketjen black to turbostratic carbons such as Vulcan XC-72 (Cabot Corp, USA) with typical surface areas in the range of 250 to 1000 $m^2/gm$. The deposition can be applied with a coating machine such as Gravure coaters from Euclid coating systems (Bay City, Mich., USA). A slurry composition comprising of carbon black and PTFE (poly tetrafluoro ethylene) in aqueous suspension (such as Dupont TFE-30, Dupont USA) is applied to a set thickness over the carbon paper or cloth substrate with the aid of the coating machine. Typical thickness of 50-500 microns is used. Pore forming agents are used to prepare this diffusion layer on the carbon conducting paper or cloth substrate. Careful control of the pore formers which consist of various combinations of carbonates and bicarbonates (such as ammonium and sodium analogs) affords control of gas access to the reaction zone. This is achieved by incorporation of these agents in the slurry mixture comprising of carbon black and PTFE suspension. Typical porosity rendered in this fashion differs from anode and cathode electrode and is in the range of 10-90%. Coated carbon substrates containing the gas diffusion layers are sintered to enable proper binding of components. This can be achieved using thermal treatment to temperatures significantly above the glass transition point for PTFE, usually in the range 100 to 350° C. for 5 to 30 minutes.

Formation of Reaction Layer Comprising of Electrocatalyst and Ion Conducting Components On the surface of the above mentioned gas diffusion layer, an additional layer comprising of a carbon supported catalyst, ion conducting elements (such as phosphoric acid, polyphosphoric acid or perfluoro sulfonic acid analogs), pore forming agents, and binder (such as PTFE, using TFE-30 dispersion, from Dupont, USA) is added using a variety of methods comprising of spraying, calendaring and or screen printing.

Typical steps first include appropriate choice of the electrocatalyst based on anode or cathode electrodes. For the Anode, Pt in conjunction of another transition metal such as Ru, Mo, Sn is used. This is motivated by the formation of oxides on these non noble transition metals at lower potentials to enable oxidation of CO or other $C_1$ moieties which are typical poisons in the output feed of fuel reformers (steam reformation of natural gas, methanol, etc.). The choice of electrocatalyst included Pt and second transition element either alloyed or in the form of mixed oxides. The choice is dependant on the application based on choice of fuel feedstock. The electrocatalysts are in the form of nanostructured metal alloys or mixed oxide dispersions on carbon blacks (turbostratic carbon support materials usually Ketjen black or similar material).

For the cathode, electrocatalysts which are relatively immune from anion adsorption and oxide formation are preferred. The choice of the alloying element ranges between available first row transition elements, typically Ni, Co, Cr, Mn, Fe, V, Ti, etc. Recent studies have shown that adequate alloying of these transition elements with Pt results in deactivation of Pt for most surface processes (lowering of surface workfunction) (Mukerjee and Urian 2002; Teliska, Murthi et al. 2003; Murthi, Urian et al. 2004; Teliska, Murthi et al. 2005). This renders the surface largely bare for molecular oxygen adsorption and subsequent reduction. Lowering anion adsorption such as phosphate anion for a phosphoric acid based ion conductor enables enhanced oxygen reduction kinetics. In addition to choice of alloys, the use of perfluorosulfonic acids either alone or as a blend with other ion conductors are used to enhance oxygen solubility. It is well known that oxygen solubility is approximately eight times higher in these fluorinated analogs as compared to phosphoric acid based components (Zhang, Ma et al. 2003). The electrocatalyst can be obtained from commercial vendors such as Columbian Chemicals (Marrietta, Ga., USA), Cabot Superior Micro-powders (Albuquerque, N. Mex., USA). The typical weight ratio of the catalyst on carbon support being 30-60% of metal on carbon.

The second step generally involves preparation of slurry using a combination of electrocatalyst in a suspension containing solubilized form of the polymer substrate (structures 1 and 2), ion conducting element in a blend of phosphoric acid, polyphoshoric acid, and analogs of perfluorinated sulfonic acids together with PTFE (Dupont, USA) as a binder. Additionally, pore forming components based on a combination of carbonates and bicarbonates are added in a ratio of 5-10% by weight. The ratio of the components have a variation of 10-30% within choice of each component enabling a total catalyst loading 0.3 to 0.4 mg of Pt or Pt alloy/$cm^2$. The application of the slurry is achieved via a combination or exclusive application of calendaring, screen printing or spraying.

The third step of sintering and drying of the electrode layer is performed after the catalyst is applied in the form of a reaction layer. In this step the electrodes are subjected to a two step process which initially involves drying at 160° C. for about 30 minutes followed by sintering at temperatures in the range of 150-350° C. for a time period in the range of 30 minutes to 5 hrs.

Formation of Membrane Electrode Assembly

To prepare membrane electrode assemblies, a sandwich of anode membrane and cathode electrodes is placed in an appropriate arrangement of gasket materials, typically a combination of polyimide and polytetrafluorethylene (PTFE, Dupont, USA). This is followed by hot pressing with a hydraulic press or other similar device. Pressures in the range of 0.1 to 10 bars are applied with platen temperatures in the range of 150 to 250° C. for time periods typically in the range of 10 to 60 minutes. The prepared membrane electrode assemblies have thickness in the range of 75 to 250 micro meters. This allows for a final assembly of the membrane electrode assembly.

The following non-limiting examples are illustrative of the invention. All documents mentioned herein are incorporated herein by reference.

Example 1

Synthesis of 2,5-di(Pyridin-3-yl)benzene-1,4-diol 2,5-Dibromohydroquinone, tetrahydrofuran and 3,4-Dihydro-2H-pyran is added to a degassed flask. The solution is stirred at 0° C. under argon for 15 min. (+−)-Camphor-10-sulfonic acid(b) is added and the solution is stirred at room temperature for 8 hours. The precipitated product is filtered and washed with distilled water in order to remove excess CSA. A small amount of cold Hexane is added for better drying. The bis-(2-Tetrahydro-2H-pyranyl(1)acid)-2,5-dibromobenzene is dried under vacuum and product is obtained at a 90% yield.

Bis-(2-Tetrahydro-2H-pyranyl(1)acid)-2,5-dibromobenzene and distilled tetrahydrofuran is added to a degassed three neck flask fitted with a cooler, an additional funnel with septrum, and a thermometer. Butillithium solution is slowly added to the degassed solution at −80° C. The mixture is lifted for 3 hours at −40° C. Then the mixture is cooled again at −80° C. and trimethyl borate is slowly added. The mixture is lifted under stirring at room temperature for 24 hours. Distilled water is added for 3 hours in order to hydrolyze the boric ester groups. The organic layer is then separated and the organic solvent is removed under reduced pressure. The residue is treated with Hexane for 24 hours. The product 2,5-(Tetrahydro-2H-pyranyl(1)acid)phenyl diboronic acid is filtered and dried at 30° C. under vacuum and the THP-protected diol is obtained at 55% yield.

Tetrahydrofuran and 2M $Na_2CO_3$ are added to a degassed mixture of 3-Bromopyridine, 2,5-(Tetrahydro-2H-pyranyl(1) acid)phenyl diboronic acid, and $Pd(PPh_3)_4$ under a continuous stream of argon. The solution is vigorously stirred at reflux for 4 days under argon. The organic layer is then separated and the organic solvent is removed under reduced pressure. The residue is treated with MeOH, filtered, and dried at 40° C. under vacuum. Thus, the THP-protected diol is obtained in 70% yield.

HCl 37% is added to a solution of the THP-protected diol in THF and MeOH, and the mixture is then stirred at 50° C. for 24 hours. The organic solvent is removed under reduced pressure and a small amount of distilled water is added. The soluble product is filtered in order to remove by-products. Deprotonation is performed using 2M $Na_2CO_3$ and sinking of the product. Filtration, washing with water and cold hexane, and drying at 50° C. under vacuum results in 2,5-di(Pyridin-3-yl)benzene-1,4-diol in 60% yield.

Coupling reactions where two hydrocarbon radicals are coupled with the aid of a metal containing catalyst are used for the synthesis of monomers. One of the synthetic procedures which is followed for the synthesis of the monomer is given below.

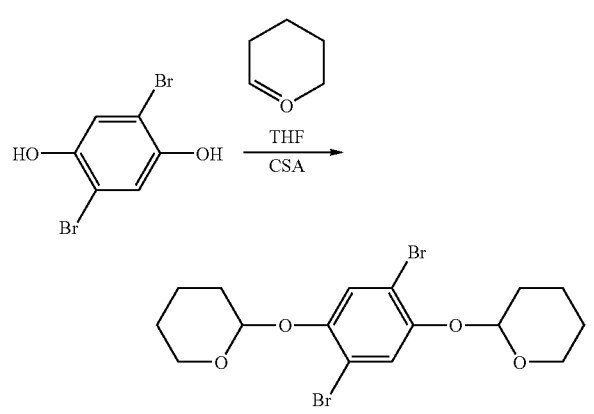

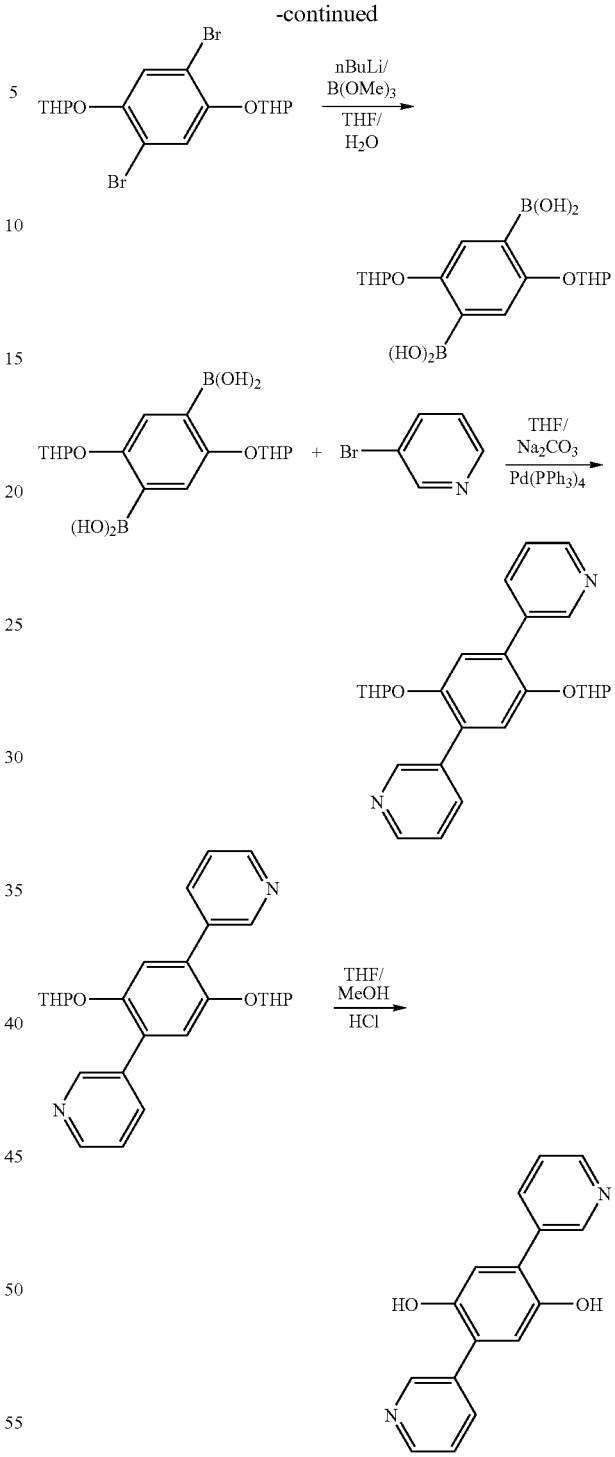

Example 2

Synthesis of copolymer dPPy(50)coPPyPES

Bis-(4-fluorophenyl)sulfone (3.147 mmol, 0.800 g), 2,5-di (Pyridin-3-yl)benzene-1,4-diol (1.573 mmol, 0.415 g), 2,5-Bis(4-hydroxy-phenyl)pyridine (1.573 mmol, 0.414 g), $K_2CO_3$ (3.650 mmol, 0.504 g), DMF (10.0 ml) and Toluene (6.5 ml) are added to a degassed flask equipped with a Dean- Stark trap. The mixture is degassed under Ar and stirred at 150° C. for 24 hours, and then stirred at 180° C. for 48 hours. The obtained viscous product is diluted in DMF and precipitated in a 10-fold excess mixture of MeOH, washed with $H_2O$ and Hexane, and dried at 80° C. under vacuum. The same procedure is followed to produce copolymer dPPy(40)coP-PyPES, by varying the feed ratio of the two diols.

Example 3

Synthesis of copolymer dPPy(50)coPPyPO

Bis(4-fluorophenyl)phenylphosphine oxide (2.548 mmol, 0.800 g), 2,5-di(Pyridin-3-yl)benzene-1,4-diol (1.274 mmol, 0.336 g), 2,5-Bis(4-hydroxyphenyl)pyridine (1.274 mmol, 0.335 g), $K_2CO_3$ (2.955 mmol, 0.408 g), DMF (9.0 ml) and Toluene (5.7 ml) are added to a degassed flask equipped with a Dean-Stark trap. The mixture is degassed under Ar and stirred at 150° C. for 24 hours, and then stirred at 180° C. for 8 hours. The obtained viscous product is precipitated in a 10-fold excess mixture of MeOH, washed with $H_2O$ and Hexane, and dried at 80° C. under vacuum. The same procedure is followed to produce copolymers with different 2,5-di (Pyridin-3-yl)benzene-1,4-diol molar percentage, by varying the feed ratio of the two diols.

Example 4

Synthesis of homopolymer dPPyPES

Bis-(4-fluorophenyl)sulfone (2.753 mmol, 0.700 g), 2,5-di (Pyridin-3-yl)benzene-1,4-diol (2.753 mmol, 0.727 g), $K_2CO_3$ (3.194 mmol, 0.441 g), DMF (8.9 ml) and Toluene (5.7 ml) are added to a degassed flask equipped with a Dean-Stark trap. The mixture is degassed under Ar and stirred at 150° C. for 24 hours, and then stirred at 180° C. for 4 days. The obtained product is precipitated in a 10-fold excess mixture of MeOH, washed with $H_2O$ and Hexane, and dried at 80° C. under vacuum. The same procedure is followed to produce homopolymers with different 2,5-di(Pyridin-3-yl) benzene-1,4-diol molar percentage, by varying the feed ratio of the two reactants.

Example 5

Synthesis of homopolymer dPPyPO

Bis(4-fluorophenyl)phenylphosphine oxide (2.229 mmol, 0.700 g), 2,5-di(Pyridin-3-yl)benzene-1,4-diol (2.229 mmol, 0.589 g), $K_2CO_3$ (2.586 mmol, 0.357 g), DMF (7.8 ml) and Toluene (5.0 ml) are added to a degassed flask equipped with a Dean-Stark trap. The mixture is degassed under Ar and stirred at 150° C. for 24 hours, and then stirred at 180° C. for 2 days. The obtained product is precipitated in a 10-fold excess mixture of MeOH, washed with $H_2O$ and Hexane, and dried at 80° C. under vacuum. The same procedure is followed to produce homopolymers with different 2,5-di(Pyridin-3-yl)benzene-1,4-diol molar percentage, by varying the feed ratio of the two reactants.

Example 6

Membrane Electrode Assembly

Carbon paper (Toray TGP H-120) is initially wet proofed by dipping in a TFE-30 dispersion (Dupont, USA). For this, a typical loading of 0.6-1.5 mg/cm$^2$ is used. The gas diffusion layer is applied using a slurry comprising of Ketjen black (Engelhard, USA) with a surface area of 250 m$^2$/gm, TFE-30 dispersion (Dupont, USA), ammonium carbonate in a ratio of 60:30:10% respectively. After adequate stirring, this slurry is calendared (Gravure coaters from Euclid coating systems (Bay City, Mich., USA) on to the wet proofed carbon paper using a calendaring machine to a thickness of about 50-100 micro meters. After the gas diffusion layer is obtained, it is next sintered in air using a muffle furnace with adequate venting at a temperature in the range of 100-200° C. for 10 to 15 hours.

The reaction layer is next deposited using a choice of individual anode and cathode electrocatalysts. For this, a separate slurry is prepared containing the electrocatalyst, binder (TFE-30, dispersion from Dupont, USA), ammonium bicarbonate, and a blend of solubilized form of the polymer electrolytes (structures 1 and 2, either alone or in a combined form) and both volatile and non volatile acid (i.e., poly fluorinated sulfonic acid, PFSA in a combination with phosphoric acid) in a ratio ranging between 1:1 to 1:5. This slurry is calendared onto the gas diffusion side of the electrode to make the individual anode and cathode electrodes using the same procedure described above with the aid of the coating machine (Gravure coaters from Euclid coating systems (Bay City, Mich., USA). Additionally, the reaction layer in the cathode electrode also contains 5% by weight ammonium carbonate to afford pore formation.

Acid doped blended polymer membranes with a combination of structures 1 and 2 as described in earlier examples is next used to prepare the membrane electrode assembly. For this, a die set up is used with Teflon (Dupont, USA) and polyimide gaskets to achieve the appropriate compression and sealing in the single cell. Hot pressing conditions are 150-250° C. and 10 bar for 25 minutes.

The membrane electrode assembly so prepared was tested in a 5 cm$^2$ single cell (Fuel Cell technologies, Albuquerque, N. Mex., USA) with the aid of a potentiostat (Autolab PGSTAT-30) in conjunction with a current booster (10 A). Polarization measurements were conducted at 170-200° C., 1.5 bars, $H_2$/Air (2:2 stoichiometric flow). Steady state current was also monitored for stability studies up to 400 hrs at a constant potential of 0.5V vs. RHE.

What is claimed is:

1. An aromatic polyether copolymer comprising the general structural formula:

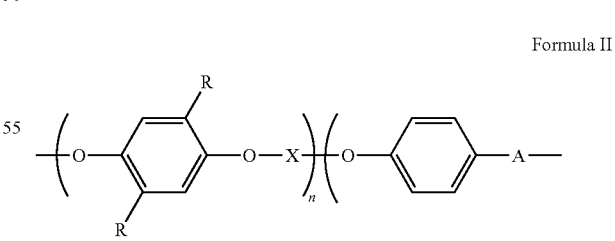

Formula II

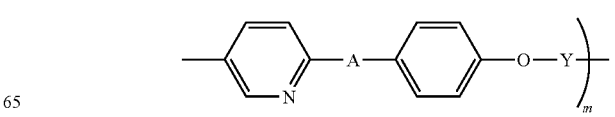

wherein R is selected from the group consisting of:

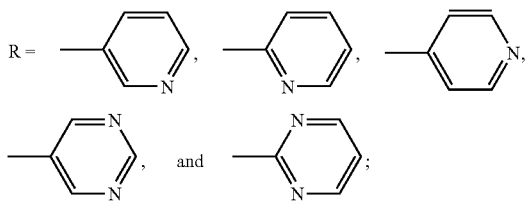

X is selected from the group consisting of:

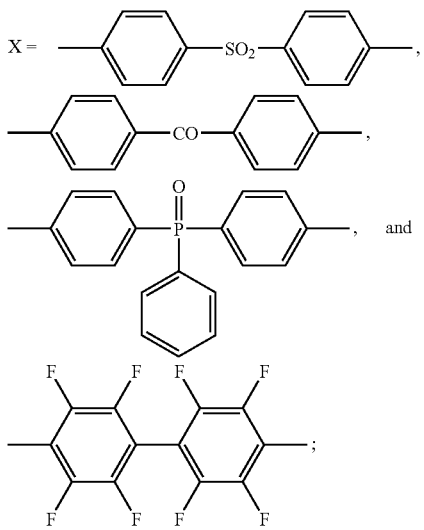

Y is selected from the group consisting of:

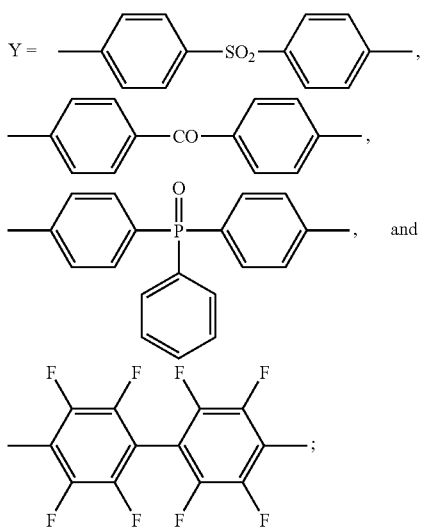

A is selected from the group consisting of:

A=—CH$_2$, —CF$_2$, -phenyl and, none; and n ranges from about 0.5% to about 99.5%, m ranges from about 99.5% to about 0.5%, and n+m=100%; or a salt thereof.

2. The aromatic polyether copolymer of claim 1, wherein n ranges from about 0.5% to about 60% and m ranges from about 99.5% to about 40%.

3. The aromatic polyether copolymer of claim 1 wherein n ranges from about 40% to about 50% and m ranges from about 60% to about 50%.

4. The aromatic polyether copolymer of claim 1 having a molecular weight ($M_n$) of no greater than about 120,000.

5. The aromatic polyether copolymer of claim 1 having a molecular weight ($M_n$) ranging from about 10,000 to about 100,000.

6. The aromatic polyether copolymer of claim 1 or a salt thereof, wherein

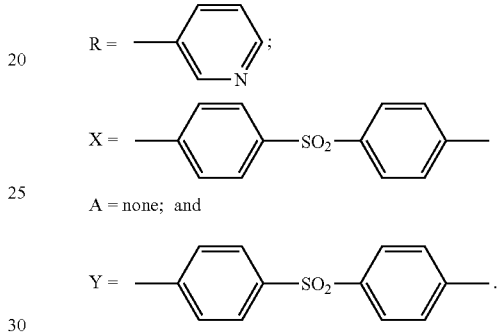

7. The aromatic polyether copolymer of claim 1 or a salt thereof, wherein

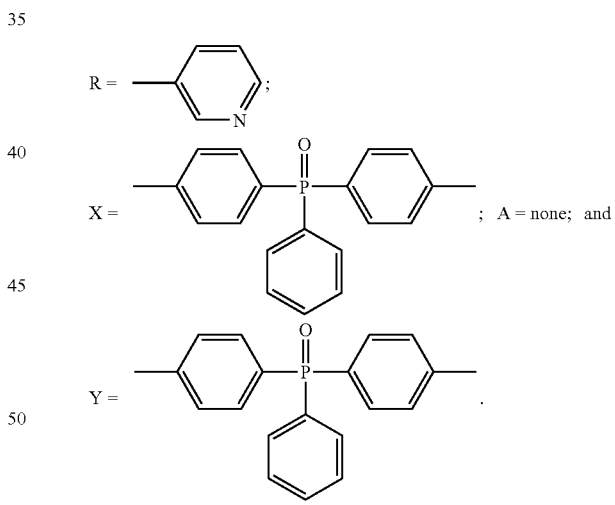

8. The copolymer of claim 1, wherein the copolymer is a block copolymer, random copolymer, periodic copolymer and/or alternating polymer.

9. A process for preparing the polymer or copolymer of claim 1, wherein the process comprises polycondensing monomers at high temperature under conditions such that the copolymer is formed.

10. A process for preparing the copolymer of claim 1, wherein the process comprises reacting an aromatic difluoride with a compound comprising the general structural formula:

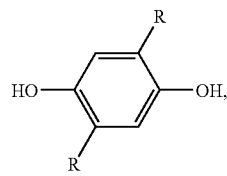

wherein R is selected from the group consisting of

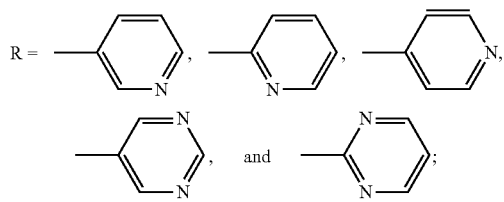

or a salt thereof.

11. The process of claim 10, wherein the aromatic difluoride is bis-(4-fluorophenyl)sulfone, bis-(4-fluorophenyl)phenylphosphine oxide, 4,4'-difluorobenzophenone, or decafluorobipheynyl.

12. A blend of copolymers or homopolymers, the blend prepared by mixing a dimethylacetamide solution of the copolymer of claim 1 and a dimethylacetamide solution of a polymer comprising the general structural formula:

Formula III

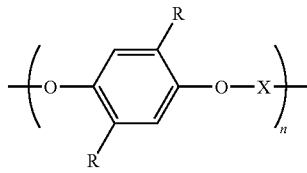

wherein R is selected from the group consisting of:

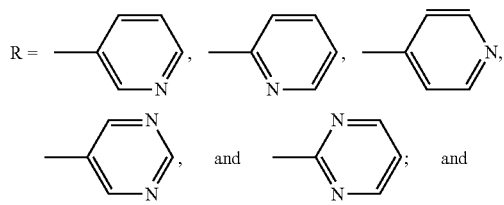

X is selected from the group consisting of:

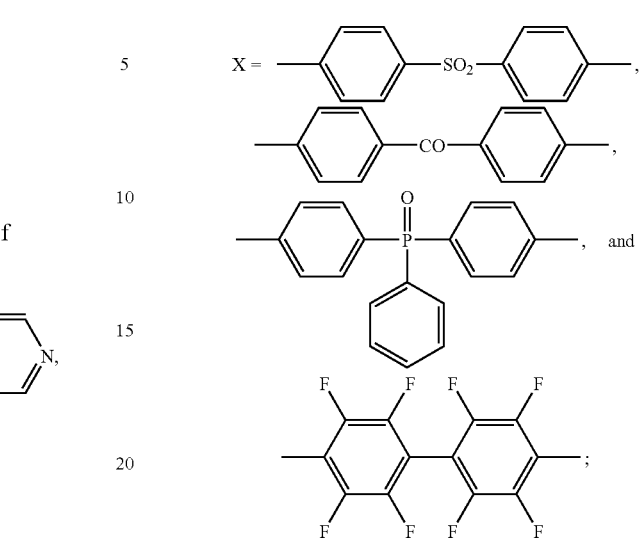

or a salt thereof, in a predetermined ratio, and n is a positive integer.

13. The blend of claim 12, wherein the predetermined ratio is about 50/50.

14. A composition comprising a slurry mixture of a copolymer of claim 1 or the blend of claim 12 and a polar aprotic solvent.

15. A method of preparing a catalyst, the method comprising:
    (a) depositing a layer of a mixture of the composition of claim 14 and a Pt catalyst by calendaring, screen printing or spraying on a hydrophobic layer; and
    (b) drying and sintering the layer deposited in step (a), thereby preparing the catalyst.

16. A layered membrane electrode assembly, comprising:
    a substrate layer;
    two gas diffusion layers; and
    a polymer electrolyte comprising the copolymer of claim 1 or the blend of claim 12 doped with one or more acid.

17. A layered membrane electrode assembly, comprising:
    a gas diffusion layer;
    a reaction layer; and
    a polymer electrolyte comprising the copolymer of claim 1 or the blend of claim 16 doped with one or more acid.

18. The aromatic copolymer of claim 4 wherein n ranges from about 0.5% to about 60% and m ranges from about 99.5% to about 40%.

19. The aromatic copolymer of claim 4 wherein n ranges from about 5% to about 50% and m ranges from about 95% to about 50%.

* * * * *